(12) United States Patent
Benkreira et al.

(10) Patent No.: US 10,970,792 B1
(45) Date of Patent: Apr. 6, 2021

(54) LIFE EVENT BANK LEDGER

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/703,305

(22) Filed: Dec. 4, 2019

(51) Int. Cl.
    *G06Q 40/00* (2012.01)
    *G06N 20/00* (2019.01)
    *G06F 16/21* (2019.01)

(52) U.S. Cl.
    CPC .............. *G06Q 40/12* (2013.12); *G06F 16/21* (2019.01); *G06N 20/00* (2019.01)

(58) Field of Classification Search
    CPC .......... G06Q 40/12; G06N 20/00; G06F 16/21
    See application file for complete search history.

(56) References Cited

U.S. PATENT DOCUMENTS

| | | | | |
|---|---|---|---|---|
| 6,334,110 B1 * | 12/2001 | Walter | .................. | G06Q 30/02 705/14.41 |
| 8,924,295 B2 * | 12/2014 | Aaron | .................. | H04W 12/12 705/44 |
| 10,115,153 B2 * | 10/2018 | Zoldi | .................. | G06Q 20/4016 |
| 10,346,869 B1 * | 7/2019 | Ahmed | .............. | G06Q 30/0226 |
| 10,475,125 B1 * | 11/2019 | Kumari | .................... | G06N 5/04 |
| 2005/0043961 A1 * | 2/2005 | Torres | ..................... | G06F 21/55 705/35 |
| 2010/0100469 A1 * | 4/2010 | Buchanan | ............. | G06Q 10/06 705/35 |
| 2010/0161379 A1 * | 6/2010 | Bene | ....................... | G06Q 30/02 705/7.31 |
| 2012/0109802 A1 * | 5/2012 | Griffin | ................... | G06Q 40/00 705/35 |
| 2012/0246121 A1 * | 9/2012 | Osborne | ................. | G06T 11/60 707/687 |
| 2013/0030994 A1 | 1/2013 | Calman et al. | | |

(Continued)

FOREIGN PATENT DOCUMENTS

WO    WO-2005041057 A1 *   5/2005  ............. G06F 21/55

*Primary Examiner* — Ashford S Hayles
(74) *Attorney, Agent, or Firm* — DLA Piper LLP (US)

(57) ABSTRACT

A system and method for generating a ledger is disclosed herein. A computing system receives, from one or more third party vendors, a plurality of transactions associated with a user. The computing system parses the plurality of transactions to identify one or more parameters associated with each transaction of the plurality of transactions. The computing system groups the one or more transactions into one or more clusters based on the identified one or more parameters. The computing system associates a life event to each cluster of the one or more clusters. The computing system interfaces with a client device associated with the user to confirm an associated life event. Upon receiving a confirmation from the user regarding the associated life event, the computing system generates a ledger. The ledger includes the life event and the one or more transactions associated therewith.

18 Claims, 7 Drawing Sheets

(56) References Cited

U.S. PATENT DOCUMENTS

| | | | |
|---|---|---|---|
| 2013/0117155 A1* | 5/2013 | Glasgo | G06Q 30/00 705/26.35 |
| 2013/0325681 A1* | 12/2013 | Somashekar | H04M 15/8011 705/35 |
| 2014/0089197 A1* | 3/2014 | Talbert | G06Q 20/4016 705/44 |
| 2014/0351136 A1* | 11/2014 | Kaleedhass | G06Q 20/4014 705/44 |
| 2015/0088739 A1* | 3/2015 | Desai | G06N 5/046 705/42 |
| 2015/0106216 A1* | 4/2015 | Kenderov | G06Q 20/409 705/21 |
| 2015/0142595 A1* | 5/2015 | Acuna-Rohter | G06Q 30/06 705/21 |
| 2016/0203485 A1* | 7/2016 | Subramanian | G06Q 20/4016 705/44 |
| 2016/0239650 A1* | 8/2016 | Mao | G06F 21/31 |
| 2016/0314528 A1* | 10/2016 | Abbott | G06Q 40/00 |
| 2016/0378760 A1* | 12/2016 | Braz | G06Q 10/107 707/728 |
| 2017/0004486 A1* | 1/2017 | Dhala | G06Q 20/34 |
| 2017/0076379 A1* | 3/2017 | Wadley | G06Q 40/06 |
| 2017/0098212 A1* | 4/2017 | Dhala | G06Q 20/3223 |
| 2017/0116578 A1* | 4/2017 | Hadatsuki | G06Q 10/1095 |
| 2017/0171795 A1* | 6/2017 | Wang | H04W 4/02 |
| 2017/0177722 A1* | 6/2017 | Cavalin | H04L 51/32 |
| 2017/0357971 A1* | 12/2017 | Pitz | H04W 64/00 |
| 2017/0357977 A1* | 12/2017 | Pitz | G06Q 20/32 |
| 2018/0109386 A1* | 4/2018 | Khan | G06Q 20/4016 |
| 2018/0218062 A1* | 8/2018 | Verma | G06Q 30/0206 |
| 2018/0247354 A1* | 8/2018 | Pratt | H04L 47/10 |
| 2018/0341950 A1* | 11/2018 | Atkins | G06Q 20/401 |
| 2019/0287116 A1* | 9/2019 | Karantzis | H04L 63/102 |
| 2019/0295085 A1* | 9/2019 | Ashiya | G06Q 20/3823 |
| 2020/0065426 A1* | 2/2020 | Hart | G06F 16/904 |
| 2020/0065894 A1* | 2/2020 | Hart | G06F 16/23 |

* cited by examiner

US 10,970,792 B1

LIFE EVENT BANK LEDGER

FIELD OF THE DISCLOSURE

The present disclosure generally relates to a method and a system for generating a ledger.

BACKGROUND

Bank/credit card statements (or ledgers) are dull, difficult to read and make use of, and generally only allow customers and account holders to view their purchasing activity and get an update on their account status. Information in traditional bank statements may not be presented in a way that is appealing to account holders, or provide a more comprehensive overview of a user's spending habits.

SUMMARY

Embodiments disclosed herein generally related to a system and method for generating a ledger. In some embodiments, a method of generating a ledger is disclosed herein. A computing system receives, from one or more third party vendors, a plurality of transactions associated with a user. The computing system parses the plurality of transactions to identify one or more parameters associated with each transaction of the plurality of transactions. The computing system groups one or more transactions into one or more clusters based on the identified one or more parameters. The computing system associates a life event to each cluster of the one or more clusters. The computing system interfaces with a client device associated with the user to confirm an associated life event. Upon receiving a confirmation from the user regarding the associated life event, the computing system generates a ledger. The ledger includes the life event and the one or more transactions associated therewith.

In some embodiments, interfacing with the client device associated with the user to confirm an associated life event includes the computing system activating an interactive agent configured to interact with the client device. The interactive agent generates a confirmation message to be transmitted to the client device. The confirmation message seeks to confirm the associated life event. The interactive agent transmits the confirmation message to the client device.

In some embodiments, transmitting the confirmation message to confirm the associated life event includes the interactive agent transmitting the confirmation message as a text message to a text message application executing on the client device.

In some embodiments, generating the confirmation message to be transmitted to the client device includes the interactive agent generating an electronic message that includes one or more pre-generated hyperlinks. The one or more pre-generated hyperlinks includes at least one hyperlink corresponding to a confirmation of the associated life event.

In some embodiments, grouping the one or more transactions into one or more clusters based on the identified one or more parameters includes the computing system parsing the one or more transactions to identify one or more spending patterns of the user, identifying a subset of one or more transactions that differ from a spending pattern of the user, and grouping the subset of one or more transactions into at least one cluster of the one or more clusters.

In some embodiments, the one or more parameters comprises at least one or more of a merchant category code, a universal product code, a monetary amount, a facility associated with a particular transaction, a location of a particular transaction, a transaction date, a transaction time of day, a time since a last transaction, a time since last transaction that matches one or more other parameters, or a transaction day of a week.

In some embodiments, the computing system further receives, from the client device, a denial from the user regarding a second life event. The computing system reassesses the one or more transactions associated with the second life event to generate a new life event corresponding thereto.

In another embodiment, a method of generating a ledger is disclosed herein. A computing system identifies a plurality of transactions associated with a user. The computing system parses the plurality of transactions to identify one or more parameters associated with each transaction of the plurality of transactions. The computing system groups the one or more transactions into one or more clusters based on the identified one or more parameters. The computing system associates a life event to each cluster of the one or more clusters. The computing system generates an interactive graphical user interface. The interactive graphical user interface includes a ledger. The ledger includes an indication of one or more life events and corresponding transaction information associated with each respective life event. The computing system transmits, to a client device associated with the user, the interactive graphical user interface.

In some embodiments, the computing system receives input, via the interactive graphical user interface, corresponding to a request to view a subset of one or more transactions associated with a particular life event. The computing system, upon receiving the input, updates the interactive graphical user interface by populating the interactive graphical user interface with the subset of one or more transactions associated with the particular life event. The computing system transmits the updated interactive graphical user interface to the client device for display.

In some embodiments, prior to generating the graphical user interface, the computing system interfaces with the client device associated with the user to confirm an associated life event.

In some embodiments, interfacing with the client device associated with the user to confirm the associated life event includes the computing system activating an interactive agent configured to interact with the client device. The interactive agent generates a confirmation message to be transmitted to the client device. The confirmation message seeks to confirm the associated life event. The interactive agent transmits the confirmation message to the client device.

In some embodiments, transmitting the confirmation message to confirm the associated life event includes the interactive agent transmitting the confirmation message as a text message to a text message application executing on the client device.

In some embodiments, the interactive agent further receives a confirmation from the client device via user interaction with a graphical user interface of an application executing on the client device.

In some embodiments, generating the confirmation message to be transmitted to the client device, the confirmation message seeking to confirm the associated life event includes the interactive agent generating an electronic message. The electronic message includes one or more pre-generated hyperlinks. The one or more pre-generated hyperlinks include at least one hyperlink corresponding to a confirmation of the associated life event.

In some embodiments, grouping the one or more transactions into one or more clusters based on the identified one or more parameters includes the computing system parsing the one or more transactions to identify one or more spending patterns of the user, identifying a subset of one or more transactions that differ from a spending pattern of the user, and grouping the subset of one or more transactions into at least one cluster of the one or more clusters.

In some embodiments, the one or more parameters comprises at least one or more of a merchant category code, a universal product code, a monetary amount, a facility associated with a particular transaction, a location of a particular transaction, a transaction date, a transaction time of day, a time since a last transaction, a time since last transaction that matches one or more other parameters, or a transaction day of a week.

In some embodiments, the computing system receives, from the client device, a denial from the user regarding a second life event. The computing system re-assesses the one or more transactions associated with the second life event to generate a new life event corresponding thereto.

In another embodiment, a system for generating a ledger is disclosed herein. The system includes a processor and a memory. The processor is in communication with one or more client devices associated with one or more users. The memory has programming instructions stored thereon, which, when executed by the processor, performs operations. The operations include identifying a plurality of transactions associated with a user. The operations include parsing the plurality of transactions to identify one or more parameters associated with each transaction of the plurality of transactions. The operations include grouping one or more transactions into one or more clusters based on the identified one or more parameters. The operations include associating a life event to each cluster of the one or more clusters. The operations include interfacing with a client device associated with the user to confirm an associated life event. The operations include, upon receiving a confirmation from the user regarding the associated life event, generating an interactive graphical user interface that includes a ledger that includes one or more confirmed life events. The operations include transmitting the interactive graphical user interface to a client device associated with the user.

In some embodiments, the operation of interfacing with the client device associated with the user to confirm an associated life event includes activating an interactive agent configured to interact with the client device. The interactive agent generates a confirmation message to be transmitted to the client device. The confirmation message seeks to confirm the associated life event. The interactive agent transmits the confirmation message to the client device.

In some embodiments, the operation of transmitting the confirmation message to confirm the associated life event includes transmitting, by the interactive agent, the confirmation message as a text message to a text message application executing on the client device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a system and method of generating an improved ledger. Conventional ledgers typically only provide users a snapshot of a user's account activity during defined time ranges, i.e., statement periods. Such ledgers are typically inefficient for providing users with a proper overview for various transactions. This is because conventional ledgers merely provide account activity as line items in chronological order, without providing any insight on the transactions.

The one or more techniques disclosed herein address the limitations of conventional ledger systems by providing a machine learning mechanism that is able to group transactions into one or more clusters based on the relatedness of the transactions. Using information for each of the one or more clusters, the present systems may assign a life event to the transaction to provide the account holders (or users) with insights related to their account habits. For example, rather than provide account activity as line items in chronological order, the present system may generate a ledger that includes one or more life events and their associated account activities.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
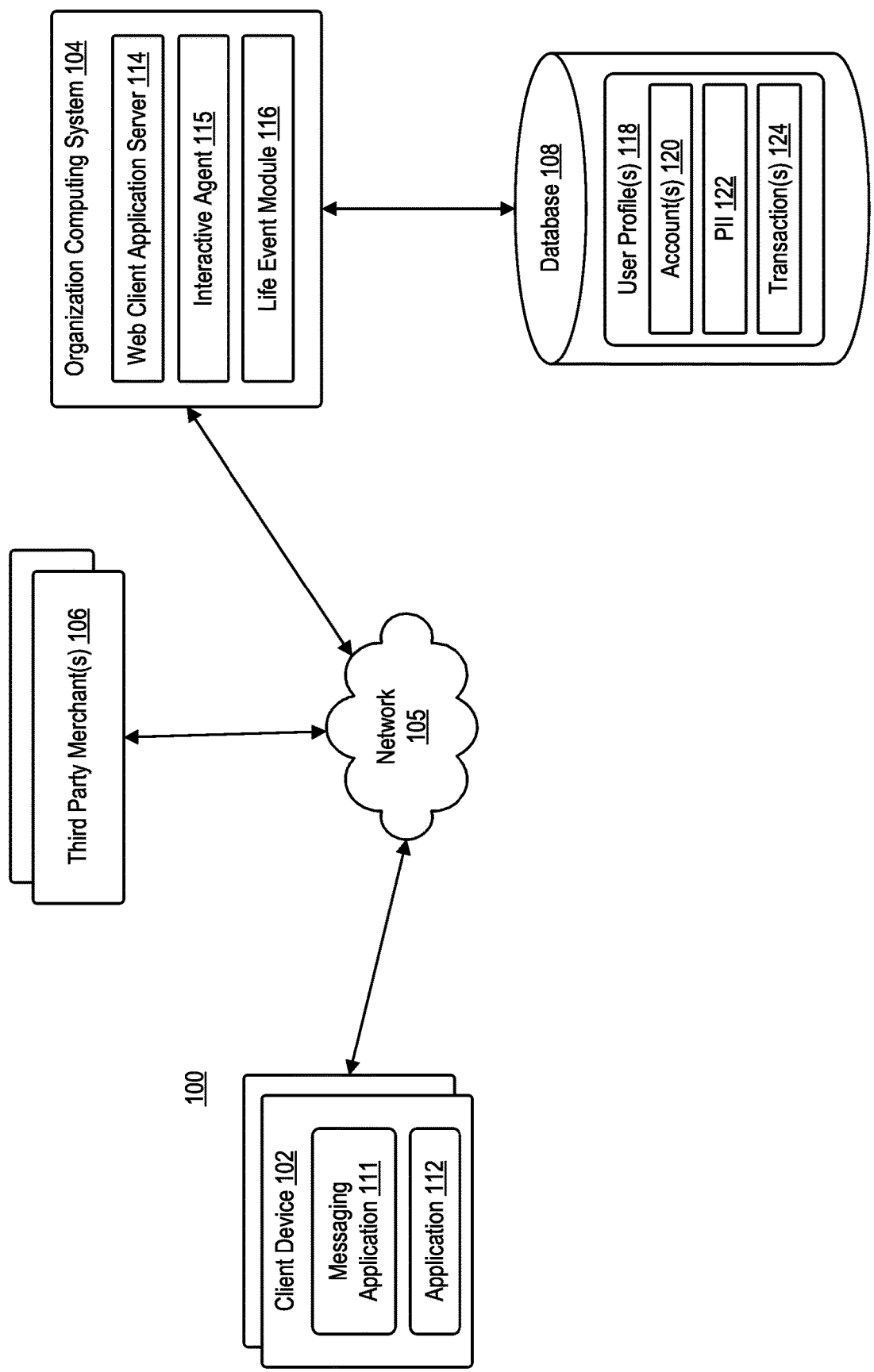
FIG. 1 is a block diagram illustrating a computing environment, according to example embodiments.

FIG. 1 is a block diagram illustrating a computing environment 100, according to one embodiment. Computing environment 100 may include at least one or more client devices 102, an organization computing system 104, and one or more third party merchants 106, and one or more data sources 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receiving information between the components of system 100.

Client device 102 may be operated by a user (or customer). For example, client device 102 may be a mobile device, a tablet, a desktop computer, or any computing system having the capabilities described herein. Client device 102 may belong to or be provided to a customer (e.g., user 101) or may be borrowed, rented, or shared. Customers may include individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 112 and messaging application 111. Application 112 may be representative of a web browser that allows access to a website or a stand-alone application. Client device 102 may access application 112 to access functionality of organization computing system 104. Client device 102 may communicate over network 105 to request a webpage, for example, from web client application server 114 of organization computing system 104. For example, client device 102 may be configured to execute application 112 to access content managed by web client application server 114. The content that is displayed to client device 102 may be transmitted from web client application server 114 to client device 102, and subsequently processed by application 112 for display through a graphical user interface (GUI) of client device 102. Messaging application 111 may be configured to provide text messaging functionality to client device 102. For example, user may access messaging application 111 to communicate with other devices over network 105 via text message.

Organization computing system 104 may include at least web client application server 114, life event module 116, and interactive agent 115. Each of life event module 116 and interactive agent 115 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Life event module 116 may be configured to generate an improved ledger. For example, life event module 116 may include one or more machine learning algorithms to generate an improved ledger that groups one or more transactions into identified life events. For example, rather than generating a ledger for a user account that merely includes a list of debits and credits in chronological order, life event module 116 may parse through transactions of the user, group the transactions into one or more clusters using one or more machine learning algorithms, and assign a life event to each of the one or more clusters. Accordingly, life event module 116 may be able to provide a visual depiction of costs associated with a particular event in a person's life. Such events may include, but are not limited to, trips, life goals (e.g., dieting), hobbies (e.g., painting, sculpting, coin collection), major events (e.g., college expenses, new baby expenses), disaster events (e.g., expenditures after a tornado, fire, natural disaster, etc.), shopping trips (e.g., every purchase associated with a single shopping trip), dates (e.g., combining movie/dinner/drink transactions), and the like. Life event module 116 is discussed in further detail below, in conjunction with FIG. 2.

Interactive agent 115 may be configured to interface with one or more client devices 102. For example, interactive agent 115 may provide a communication interface between one or more client devices 102 and organization computing system 104. In some embodiments, interactive agent 115 may communicate with client device 102 via one or more text messages. For example, interactive agent 115 may communicate with client device 102 via messaging application 111 executing on client device 102. In some embodiments, interactive agent 115 may communicate with client device 102 via electronic message ("e-mail"). In an example embodiment, interactive agent 115 may interface with client device 102 to confirm that accuracy of a life event label to a cluster of transactions. In some embodiments, interactive agent 115 may communicate with client device through web client application server 114 by requesting that application 112 display a question on client device 102. For example, if a user is viewing a bank ledger, interactive agent 115 may prompt application 112 to display a message via web client application server 114.

In some embodiments, life event module 116 may communicate with one or more third party merchants 106. Each of the one or more third party merchants 106 may be representative of one or more computing systems associated with a merchant selling goods and/or services. One or more third party merchants 106 may submit payment requests to organization computing system 104 upon receiving a payment attempt using an account associated with organization computing system. The one or more payment requests may include at least one or more of a merchant category code, a universal product code, a monetary amount, a facility associated with a particular transaction, a location of a particular transaction, a transaction date, a transaction time of day, a time since a last transaction, a time since last transaction that matches one or more other parameters, and a transaction day of a week.

Life event module 116 may communicate with database 108. As illustrated, database 108 may include one or more user profiles 118. Each user profile 118 may correspond to a respective user of an organization associated with organization computing system 104. Each user profile 118 may include one or more accounts 120, personal identification information 122, and one or more transactions 124. Each account 120 may correspond to a respective financial account with the organization. For example, within a particular user profile 118 may be one or more credit card accounts, one or more debit card accounts, one or more savings accounts, one or more checking accounts, and the like. Personal identification information 122 may include information associated with the user. In some embodiments, personal identification information 122 may include a name, home address, billing address, mailing address, telephone number, e-mail address, social security number, and the like. One or more transactions 124 may be representative of one or more transactions that occurred across the user's account. For example, one or more transactions 124 may stem from one or more third party merchants 106.

Figure 2:
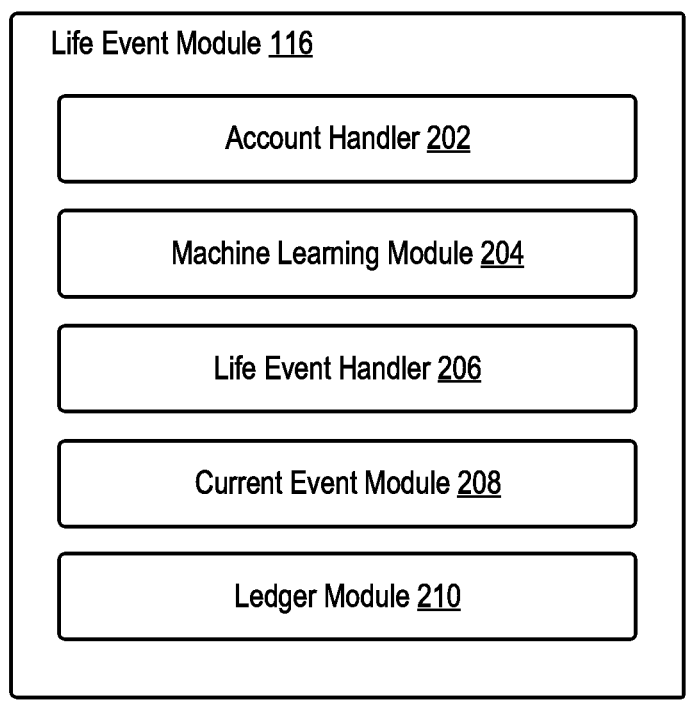
FIG. 2 is a block diagram illustrating a life event module of the computing environment of FIG. 1, according to example embodiments.

FIG. 2 is a block diagram illustrating life event module 116 in greater detail, according to example embodiments. As shown, life event module 116 may include account handler 202, machine learning module 204, life event handler 206, current event module 208, and ledger module 210.

Account handler 202 may be configured to manage one or more user accounts. For example, account handler 202 may be configured to update each user account 120 with one or more transactions 124, as well as debit or credit each user account 120 when one or more transactions 124 are received by organization computing system 104.

Machine learning module 204 may include one or more instructions to train a prediction model used by life event handler 206. To train the prediction model, machine learning module 204 may receive, as input, one or more streams of user activity. The one or more streams of user activity may correspond to one or more transactions 124 associated with a user account 120, browsing activity of the user (if available), location information associated with client device 102, and the like. In some embodiments, machine learning module 204 may further receive, as input, one or more streams of activity associated with other, similar users having accounts 120 with organization computing system 104. As such, machine learning module 204 may leverage both user specific and user agnostic information to generate the prediction model which may be used to group one or more transactions 124 into one or more clusters. Machine learning module 204 may implement one or more machine learning algorithms to train the prediction model. For example, machine learning module 204 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like.

In some embodiments, machine learning module 204 may use a supervised or an unsupervised learning model to train the prediction model. In the unsupervised learning model, machine learning module 204 may input transaction data into the prediction model to see what similarities the prediction model finds. In the supervised model, machine learning module 204 would take a subset of transaction data, either real transactions that were anonymized or fake transactions that were made to look like real ones, and machine learning module 204 may tag certain transactions as associated with each other, and other transactions as not. After that, machine learning module 204 may allow the prediction model to learn what causes transactions to be associated. Machine learning module 204 may then test the prediction model on previously unseen data elements that were also tagged, and see the success ratio. Once the prediction model reaches a threshold level of accuracy, machine learning module 204 may then use prediction model to start grouping customers' real data. Through training of the prediction model, the prediction model may learn which elements are relevant to each kind of attribute in the transaction data (e.g., merchant category code, a universal product code, a monetary amount, a facility associated with a particular transaction, a location of a particular transaction, a transaction date, a transaction time of day, a time since a last transaction, a time since last transaction that matches one or more other parameters, a transaction day of a week, and the like).

Account handler 202 may provide one or more transactions 124 as input to the prediction model generated by machine learning module 204. Prediction model may analyze one or more transactions 124 to identify one or more spending patterns of the user to which one or more transactions 124 correspond. In some embodiments, prediction model may identify one or more subsets of transactions that differ from a normal or typical spending behavior (or pattern) of the user. Prediction model may group the one or more subsets of transaction 124 into one or more clusters to be analyzed by life event handler 206.

Life event handler 206 may be configured to generate one or more life events associated with one or more cluster of transactions 124. For example, life event handler 206 may receive, as output from the prediction model, one or more clusters of transactions 124. The one or more clusters of transactions 124 may correspond to a particular life event. Life event handler 206 may be configured to assign a life event label to each cluster of transaction 124 by parsing one or more transactions 124 associated with the cluster. For example, life event handler 206 may identify one or more of a merchant category code, a universal product code, a monetary amount, a facility associated with a particular transaction, a location of a particular transaction, a transaction date, a transaction time of day, a time since a last transaction, a time since last transaction that matches one or more other parameters, and a transaction day of a week. From this information, life event handler 206 may identify a life event corresponding to the cluster of transactions 124 and assign the life event to the cluster.

Current event module 208 may work in conjunction with life event handler 206. For example, current event module 208 may be configured to communicate with one or more external data sources to identify one or more current events surrounding a cluster of transactions. In other words, current event module 208 may determine whether any external forces contributed to an identified cluster of transactions. Exemplary current events may include, but are not limited to, change of seasons, holidays, major current events (e.g., sporting events, political events, celebrity events), and the like. Using a specific example, current event module 208 may notify life event handler 206 that a cluster of transactions 124 occurred during Fourth of July weekend. Accordingly, life event handler 206 may assign "July 4th Weekend" as a life event corresponding to that cluster of transactions 124.

Ledger module 210 may be configured to generate a ledger that includes the identified one or more life events and corresponding one or more transactions 124. For example, ledger module 210 may be configured to generate a graphical user interface (GUI) that includes one or more life events and their associated transactions 124. Exemplary GUIs are described below in conjunction with FIGS. 5, 6A, and 6B.

In some embodiments, users may be able to associate and/or tag transactions via one or more GUIs (e.g., FIGS. 5, 6A, and 6B) illustrated below. For example, should life event module 116 fail to group one or more transactions into a cluster, a user, via application 112 may access the user's ledger, and associate and/or tag certain transactions. Such associations and/or tags may be stored in database 108. In some embodiments, such associations and/or tags may be used by machine learning module 204 in further training of the prediction model.

Figure 3:
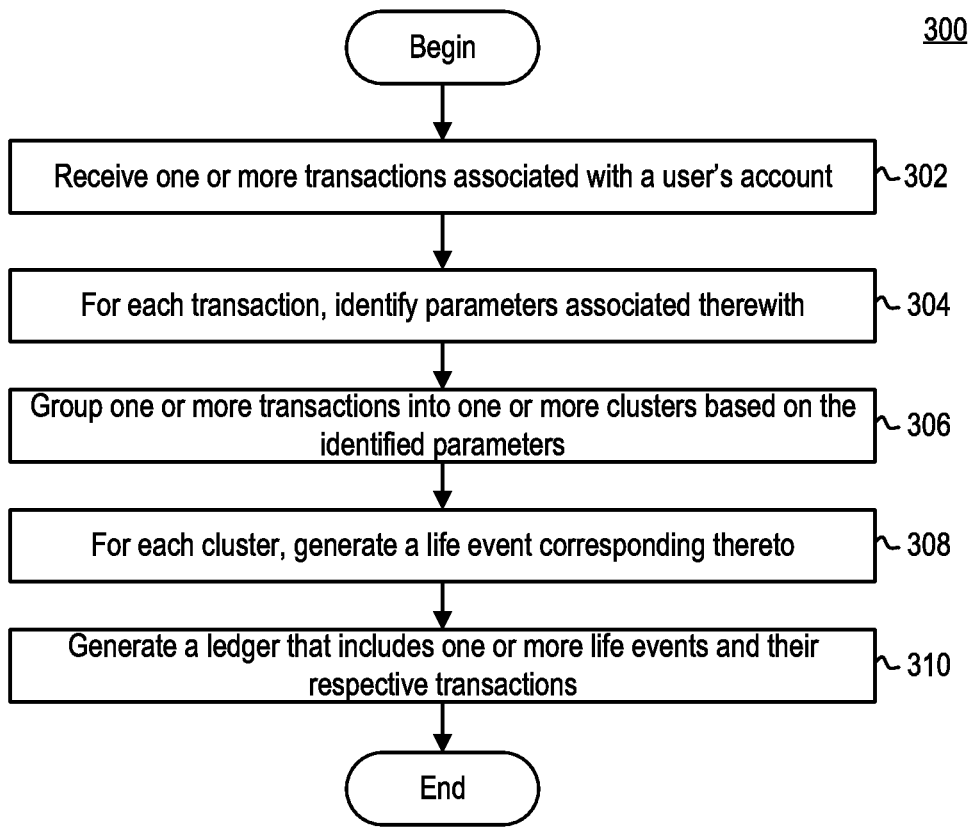
FIG. 3 is a flow diagram illustrating a method of generating a ledger, according to example embodiments.

FIG. 3 is a flow diagram illustrating a method 300 of generating a ledger, according to example embodiments. Method 300 may begin at step 302.

At step 302, organization computing system 104 may receive one or more transactions from one or more third party merchants 106. For example, one or more third party merchants 106 may transmit one or more payment requests for one or more transactions to organization computing system 104. In some embodiments, organization computing system 104 may also identify one or more transactions 124 stored in database 108. For example, account handler 202 may query database 108 for one or more transactions 124 associated with one or more accounts 120 of the user.

At step 304, organization computing system 104 may parse one or more transactions to identify one or more parameters associated therewith. In some embodiments, each of the one or more transactions may include one or more parameters associated therewith. For example, the one or more parameters may include, but are not limited to, one or more of a merchant category code, a universal product code, a monetary amount, a facility associated with a particular transaction, a location of a particular transaction, a transaction date, a transaction time of day, a time since a last transaction, a time since last transaction that matches one or more other parameters, and a transaction day of a week.

At step 306, organization computing system 104 may group one or more transactions into one or more clusters based on the one or more parameters associated with each transaction. For example, account handler 202 may provide, as input, to a prediction model generated by machine learning module 204, the one or more transactions. Prediction model may analyze the one or more transactions to identify a pattern of spending that differs from a baseline spending pattern of the user. Prediction model may group the one or more transactions in the identified pattern of spending into one or more clusters. Each cluster may correspond to a particular life event.

At step 308, organization computing system 104 may generate a life event corresponding to each cluster. In some embodiments, life event handler 206 may be configured to generate one or more life events associated with one or more clusters of transactions 124. For example, life event handler 206 may receive, as output from the prediction model, one or more clusters of transactions 124. Life event handler 206 may be configured to assign a life event label to each cluster of transaction 124 by parsing one or more transactions 124 associated with the cluster. For example, life event handler 206 may identify one or more of a merchant category code, a universal product code, a monetary amount, a facility associated with a particular transaction, a location of a particular transaction, a transaction date, a transaction time of day, a time since a last transaction, a time since last transaction that matches one or more other parameters, and a transaction day of a week. From this information, life event handler 206 may identify a life event corresponding to the cluster of transactions 124 and assign the life event to the cluster.

At step 310, organization computing system 104 may generate a ledger that includes the one or more life events. For example, ledger module 210 may be configured to generate a ledger that includes one or more life events and the one or more transactions corresponding to the life events. In some embodiments, ledger module 210 may generate a GUI that visually depicts the ledger having the one or more life events.

In some embodiments, organization computing system 104 may store the ledger that includes the one or more life events (hereinafter "life event ledger") in parallel with a traditional ledger. Accordingly, users may be able to view transactions in the traditional chronological form as well as by life event.

Figure 4:
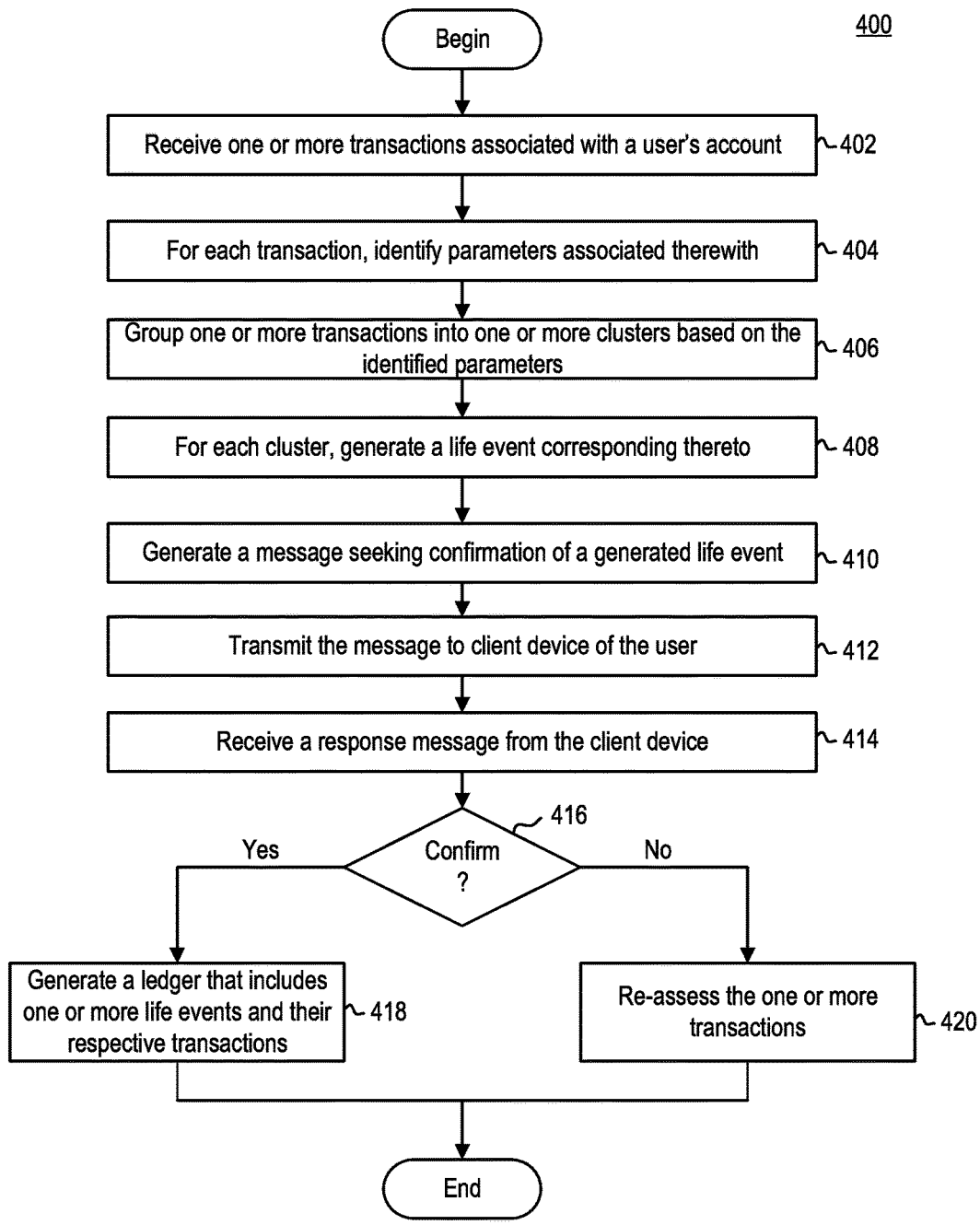
FIG. 4 is a flow diagram illustrating a method of generating a ledger, according to example embodiments.

FIG. 4 is a flow diagram illustrating a method 400 of generating a ledger, according to example embodiments. Method 400 may begin at step 402.

At step 402, organization computing system 104 may receive one or more transactions from one or more third party merchants 106. For example, one or more third party merchants 106 may transmit one or more payment requests for one or more transactions to organization computing system 104. In some embodiments, organization computing system 104 may also identify one or more transactions 124 stored in database 108. For example, account handler 202 may query database 108 for one or more transactions 124 associated with one or more accounts 120 of the user.

At step 404, organization computing system 104 may parse one or more transactions to identify one or more parameters associated therewith. In some embodiments, each of the one or more transactions may include one or more parameters associated therewith. For example, the one or more parameters may include, but are not limited to, one or more of a merchant category code, a universal product code, a monetary amount, a facility associated with a particular transaction, a location of a particular transaction, a transaction date, a transaction time of day, a time since a last transaction, a time since last transaction that matches one or more other parameters, and a transaction day of a week.

At step 406, organization computing system 104 may group one or more transactions into one or more clusters based on the one or more parameters associated with each transaction. For example, account handler 202 may provide, as input, to a prediction model generated by machine learning module 204, the one or more transactions. Prediction model may analyze the one or more transactions to identify a pattern of spending that differs from a baseline spending pattern of the user. Prediction model may group the one or more transactions in the identified pattern of spending into one or more clusters. Each cluster may correspond to a particular life event.

At step 408, organization computing system 104 may generate a life event corresponding to each cluster. In some embodiments, life event handler 206 may be configured to generate one or more life events associated with one or more cluster of transactions 124. For example, life event handler 206 may receive, as output from the prediction model, one or more clusters of transactions 124. Life event handler 206 may be configured to assign a life event label to each cluster of transaction 124 by parsing one or more transactions 124 associated with the cluster. For example, life event handler 206 may identify one or more of a merchant category code, a universal product code, a monetary amount, a facility associated with a particular transaction, a location of a particular transaction, a transaction date, a transaction time of day, a time since a last transaction, a time since last transaction that matches one or more other parameters, and a transaction day of a week. From this information, life event handler 206 may identify a life event corresponding to the cluster of transactions 124 and assign the life event to the cluster.

At step 410, organization computing system 104 may generate a message seeking confirmation of a generated life event. For example, interactive agent 115 may generate a message to be transmitted to client device 102 to seek confirmation of a generated life event. In some embodiments, interactive agent 115 may generate a text message to be transmitted to client device 102 at messaging application 111. In some embodiments, interactive agent 115 may generate an electronic message to be transmitted to client device 102. Still further, in some embodiments, interactive agent 115 may generate a message to be transmitted to an inbox associated with a user's account (e.g., inbox when a user logs into his or her account with organization computing system 104). In some embodiments, interactive agent 115 may embed one or more hyperlinks in an e-mail to be transmitted to client device 102, such that interaction with the hyperlink may signal to organization computing system 104 that the life event is correct. In some embodiments, client device 102 may view the confirmation message in a graphical user interface displayed via application 112 executing on client device 102.

At step 412, organization computing system 104 may transmit the message to client device 102. For example, interactive agent 115 may transmit the message from organization computing system 104 to client device 102.

At step 414, organization computing system 104 may receive a response message from client device 102. In some embodiments, organization computing system 104 may receive the response message in the same communication channel in which the confirmation message was transmitted. For example, if interactive agent 115 transmitted the message in a text message communication channel, interactive agent 115 may receive the message in the text message communication channel. In some embodiments, interactive agent 115 may transmit the confirmation message in a first communication channel and receive the response message in a second communication channel, different from the first communication channel. For example, interactive agent 115 may transmit the confirmation message to client device 102 in an e-mail based communication channel, and receive the response message in a text message based communication channel.

At step 416, organization computing system 104 may parse the response message to determine whether the user confirmed the life event. If, at step 416, organization computing system 104 determines that the user did not confirm the life event (i.e., the life event associated with a cluster of transactions is not correct), then method 400 proceeds to step 420. At step 420, organization computing system 104 may re-assess the cluster of transactions and assign the cluster a new life event. For example, life event module 116 may perform the one or more operations discussed above in conjunction with steps 408-414.

If, however, at step 416, organization computing system 104 determines that the user did confirm the life event (i.e., the life event associated with the cluster of transactions is correct), then method 400 proceeds to step 418. At step 418, organization computing system 104 may generate a ledger that includes the one or more life events. For example, ledger module 210 may be configured to generate a ledger that includes one or more life events and the one or more transactions corresponding to the life events. In some embodiments, ledger module 210 may generate a GUI that visually depicts the ledger having the one or more life events. In some embodiments, once life event module 116 obtains correct data directed to one or more life events, machine learning module 204 may leverage the correct data to further train and/or refine the prediction model. For example, life event module 116 may anonymize the transaction data and inject the transaction data in machine learning module 204 for future training and/or refining of the prediction model.

In some embodiments, organization computing system 104 may store the life event ledger in parallel with a traditional ledger. Accordingly, users may be able to view transactions in the traditional chronological form as well as by life event.

Figure 5:
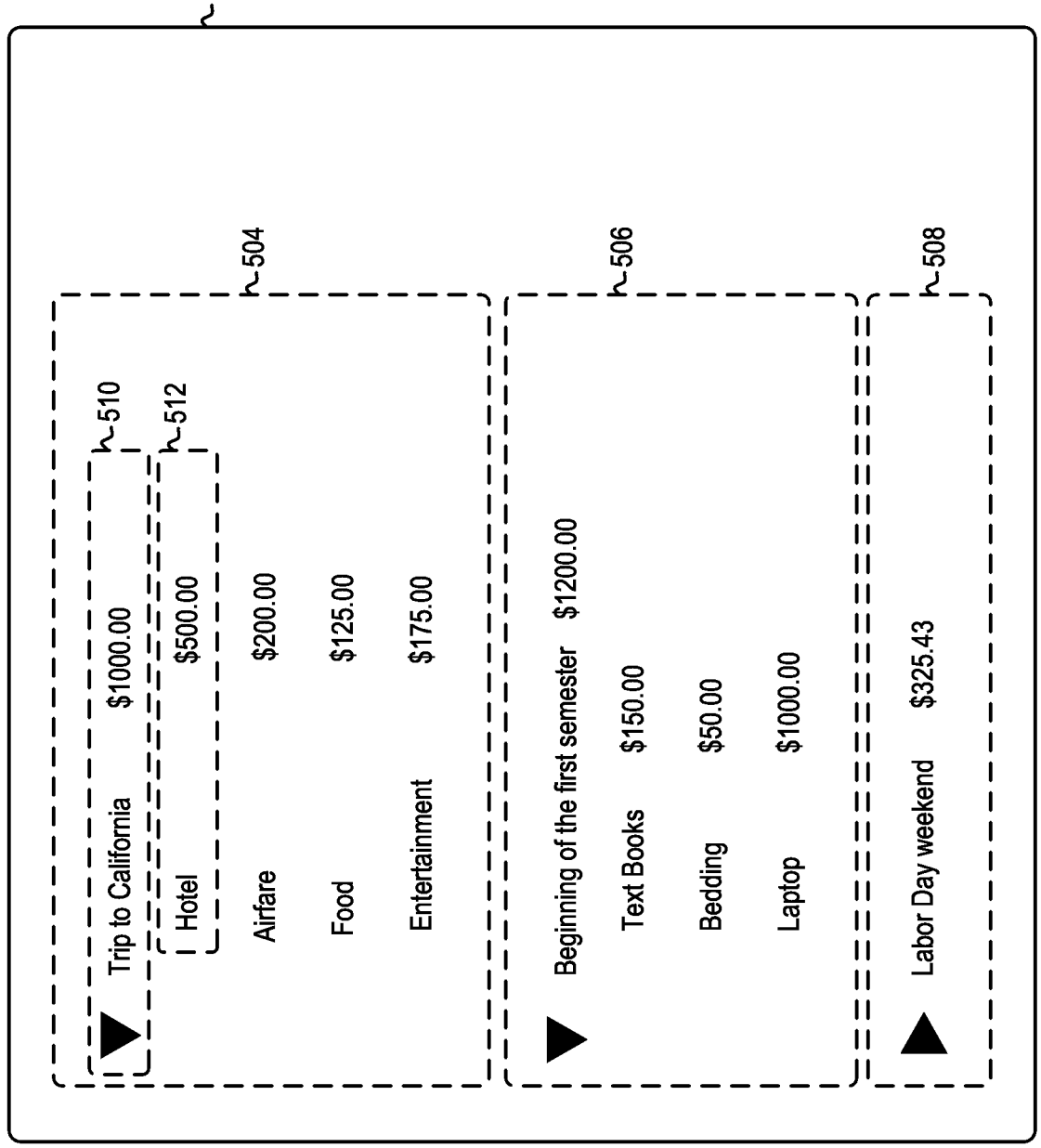
FIG. 5 illustrates an exemplary graphical user interface, according to example embodiments.

FIG. 5 is diagram 500 illustrating a graphical user interface (GUI) 502, according to example embodiments. In some embodiments, GUI 502 may be generated by organization computing system 104 and transmitted to client device 102 to be rendered and displayed. In some embodiments, GUI 502 may be accessed via application 112 executing on client device 102.

GUI 502 may be representative of a life event ledger generated by life event module 116. As illustrated, GUI 502 may include one or more life events 504-508. Life event 504 may correspond to "Trip to California." Life event 506 may correspond to "Beginning of the first semester." Life event 508 may correspond to "Labor Day weekend."

Each life event 504-508 may include one or more graphical elements associated therewith. For example, as illustrated in life event 504, life event 504 may include graphical element 510. Graphical element 510 may be a dropdown graphical element, wherein activation of the dropdown graphical element may reveal one or more sub-graphical elements 512 associated therewith. For example, graphical element 510 may recite the title of the life event: "Trip to California." Activation of graphical element 510 (e.g., via actionable arrow) may reveal one or more sub-graphical elements 512. Each sub-graphical element 512 may correspond to a transaction associated with the life event. In some embodiments, each sub-graphical element 512 may be actionable, such that clicking on each sub-graphical element 512 may generate an overlay window that includes one or more details associated with the transaction.

Figure 6B:
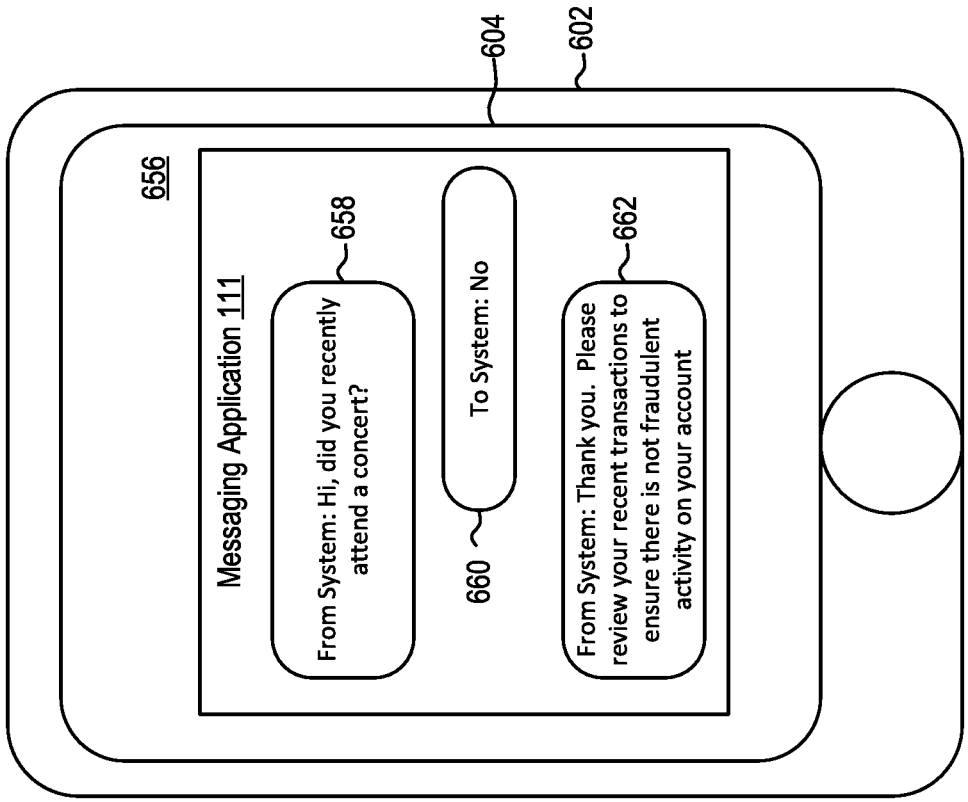
FIG. 6B illustrates an exemplary graphical user interface, according to example embodiments.
Figure 6A:
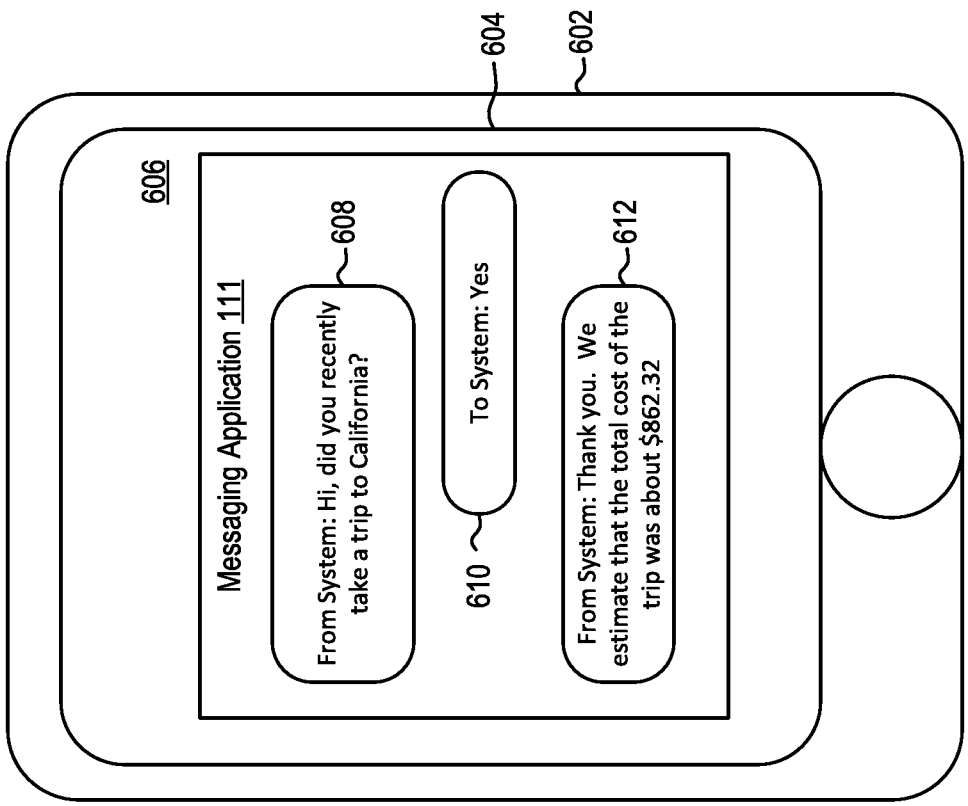
FIG. 6A illustrates an exemplary graphical user interface, according to example embodiments.

FIG. 6A illustrates an exemplary GUI displayed on a client device 602, according to example embodiments. Client device 602 may correspond to client device 102. Client device 602 may have a display 604. In some embodiments, display 604 may be configured to display GUI 606. GUI 606 may be generated by organization computing system 104 and transmitted to client device 602 for rendering and display.

GUI 606 may include a representation of messaging application 111. Displayed via messaging application 111 may be one or more text message between client device 602 and organization computing system 104. Message 608 may correspond to a confirmation message transmitted from interactive agent 115. For example, message 608 may be an attempt by organization computing system 104 to confirm the assignment of a life event to a cluster of transactions. As illustrated, message 608 may recite "Hi, did you recently take a trip to California." User of client device 602 may generate a response message (i.e., response dialogue) 610. The response message from the user may include: "Yes." Based off this response dialogue, life event module 116 may add the life event to a life event ledger. In some embodiments, interactive agent 115 may further transmit a follow-up message after receiving user confirmation. For example, interactive agent 115 may transmit message 612 to client device 602. Message 612 may include "Thank you. We estimate that the total cost of the trip was about $862.32."

FIG. 6B illustrates an exemplary GUI displayed on a client device 602, according to example embodiments. Client device 602 may correspond to client device 102. Client device 602 may have a display 604. In some embodiments, display 604 may be configured to display GUI 656. GUI 656 may be generated by organization computing 104 and transmitted to client device 602 for rendering and display.

GUI 656 may include a representation of messaging application 111. Displayed via messaging application 111 may be one or more text message between client device 602 and organization computing system 104. For example, organization computing system 104 may be configured to leverage life event information to determine whether a fraudulent event occurred on the user's account. Message 658 may correspond to a confirmation message transmitted from interactive agent 115. For example, message 658 may be an attempt by organization computing system 104 to confirm the assignment of a life event to a cluster of transactions. As illustrated, message 658 may recite "Hi, did you recently attend a concert?" User of client device 602 may generate a response message (i.e., response dialogue) 660. The response message from the user may include: "No." Based off this response dialogue, life event module 116 may determine that the one or more transactions associated with the determined life event may be fraudulent. Accordingly, life event module 116 may notify user of potential fraudulent transactions. Accordingly, interactive agent 115 may transmit a follow-up message after receiving the user's response. For example, interactive agent 115 may transmit message 662 to client device 602. Message 662 may include "Thank you. Please review your recent transactions to ensure there is not fraudulent activity on your account."

Figure 7:
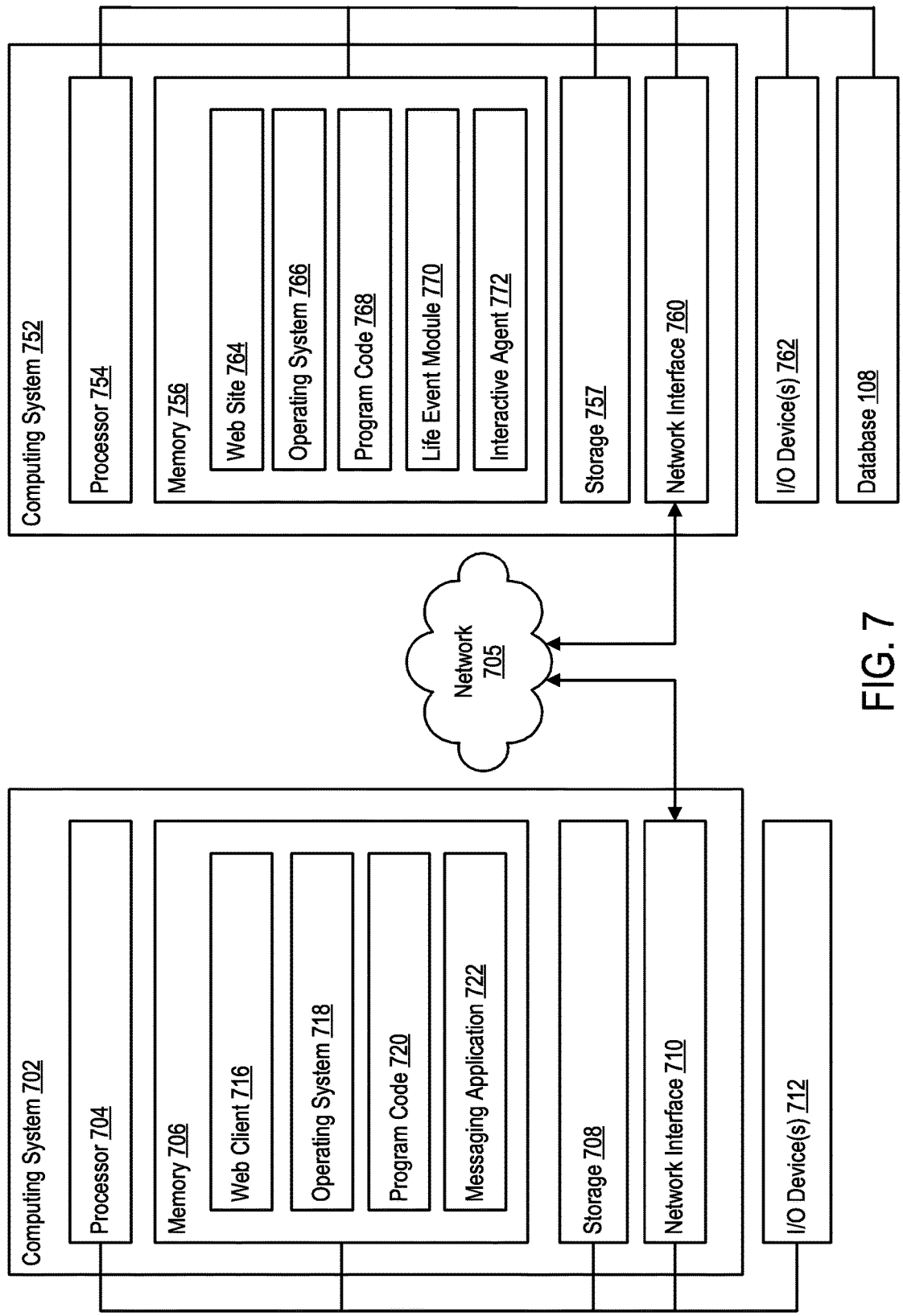
FIG. 7 is a block diagram illustrating a computing environment, according to example embodiments.

FIG. 7 is a block diagram illustrating an exemplary computing environment 700, according to some embodiments. Computing environment 700 includes computing system 702 and computing system 752. Computing system 702 may be representative of client device 102. Computing system 752 may be representative of organization computing system 104.

Computing system 702 may include a processor 704, a memory 706, a storage 708, and a network interface 710. In some embodiments, computing system 702 may be coupled to one or more I/O device(s) 712 (e.g., keyboard, mouse, etc.).

Processor 704 may retrieve and execute program code 720 (i.e., programming instructions) stored in memory 706, as well as stores and retrieves application data. Processor 704 may be included to be representative of a single processor, multiple processors, a single processor having multiple processing cores, and the like. Network interface 710 may be any type of network communications allowing computing system 702 to communicate externally via computing network 705. For example, network interface 710 is configured to enable external communication with computing system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include web client 716, operating system 718, program code 720, and messaging application 722. Program code 720 may be accessed by processor 704 for processing (i.e., executing program instructions). Program code 720 may include, for example, executable instructions for communicating with computing system 752 to display one or more pages of website 764. Web client 716 may enable a user of computing system 702 to access a functionality of computing system 752. For example, web client 716 may access content managed by computing system 752, such as website 764. The content that is displayed to a user of computing system 702 may be transmitted from computing system 752 to computing system 702, and subsequently processed by web client 716 for display through a graphical user interface (GUI) of computing system 702. Messaging application 722 may be configured to provide text messaging functionality to computing system 702. For example, user may access messaging application 722 to communicate with other devices over network 105 via text message.

Computing system 752 may include a processor 754, a memory 756, a storage 757 and a network interface 760. In some embodiments, computing system 752 may be coupled to one or more I/O device(s) 762. In some embodiments, computing system 752 may be in communication with database 108.

Processor 754 may retrieve and execute program code 768 (i.e., programming instructions) stored in memory 756, as well as stores and retrieves application data. Processor 754 is included to be representative of a single processor, multiple processors, a single processor having multiple processing cores, and the like. Network interface 760 may be any type of network communications enabling computing system 752 to communicate externally via computing network 705. For example, network interface 760 allows computing system 752 to communicate with computer system 702.

Storage 757 may be, for example, a disk storage device. Although shown as a single unit, storage 757 may be a combination of fixed and/or removable storage devices, such as fixed disk drives, removable memory cards, optical storage, network attached storage (NAS), storage area network (SAN), and the like.

Memory 756 may include website 764, operating system 766, program code 768, life event module 770, and interactive agent 772. Program code 768 may be accessed by processor 754 for processing (i.e., executing program instructions). Program code 768 may include, for example, executable instructions configured to perform steps discussed above in conjunction with FIGS. 4-5. As an example, processor 754 may access program code 768 to perform operations for generating a ledger. In another example, processor 754 may access program code 768 to perform operations for generating one or more graphical elements for inclusion in a dynamic GUI that displays the generated ledger. Website 764 may be accessed by computing system 702. For example, website 764 may include content accessed by computing system 702 via a web browser or application.

Life event module 770 may be configured to generate an improved ledger. For example, life event module 770 may include one or more machine learning algorithms to generate an improved ledger that groups one or more transactions into identified life events. For example, rather than generating a ledger for a user account that merely includes a list of debits and credits in chronological order, life event module 770 may parse through transactions of the user, group the transactions into one or more clusters using one or more machine learning algorithms, and assign a life event to each of the one or more clusters. Accordingly, life event module 770 may be able to provide a visual depiction of costs associated with a particular event in a person's life.

Interactive agent 772 may be configured to interface with one or more computing systems 702. For example, interactive agent 772 may provide a communication interface between computing system 702 and computing system 752. In some embodiments, interactive agent 772 may communicate with computing system 702 via one or more text messages. In some embodiments, interactive agent 772 may communicate with computing system 702 via e-mail. In an example embodiment, interactive agent 772 may interface with computing system 702 to confirm that accuracy of a life event label assigned to a cluster of transactions.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of generating a ledger, comprising:
  receiving, by a computing system from one or more third party vendors, a plurality of transactions associated with a plurality of users;
  anonymizing, by the computing system, the plurality of transactions;
  generating, by the computing system, a plurality of synthetic transactions configured to mimic real transactions;
  generating, by the computing system, a prediction model to identify groups of related transactions by:
    training, by the computing system, the prediction model to identify, based on the plurality of transactions and the plurality of synthetic transactions, a subset of transactions related to each other;
    testing, by the computing system, the prediction model to identify a success ratio of the training, wherein the success ratio corresponds to a threshold level of accuracy; and
    retraining and retesting, by the computing system, the prediction model until the prediction model groups the subset of transactions in accordance with the threshold level of accuracy;
  retrieving, by the computing system, a set of target transactions associated with a target user;
  identifying, by the prediction model, a baseline spending pattern of the target user for a subset of transactions included in the set of target transactions;
  identifying, by the prediction model, one or more transactions of the set of target transactions that differ from the baseline spending pattern of the target user;
  grouping, by the computing system, the one or more transactions of the set of target transactions into a cluster;
  associating, by the computing system, a life event to the cluster of the one or more transactions;
  interfacing, by the computing system, with a client device associated with the target user to confirm an associated life event; and
  upon receiving a confirmation from the target user regarding the associated life event, generating a ledger comprising the life event and the one or more transactions associated therewith.

2. The method of claim 1, wherein interfacing, by the computing system, with the client device associated with the target user to confirm the associated life event, comprises:
  activating an interactive agent configured to interact with the client device;
  generating, by the interactive agent, a confirmation message to be transmitted to the client device, the confirmation message seeking to confirm the associated life event; and
  transmitting, by the interactive agent, the confirmation message to the client device.

3. The method of claim 2, wherein transmitting, by the interactive agent, the confirmation message to confirm the associated life event, comprises:
  transmitting, by the interactive agent, the confirmation message as a text message to a text message application executing on the client device.

4. The method of claim 2, generating, by the interactive agent, the confirmation message to be transmitted to the client device, the confirmation message seeking to confirm the associated life event, comprises:
  generating, by the interactive agent, an electronic message comprising one or more pre-generated hyperlinks, the one or more pre-generated hyperlinks comprising at least one hyperlink corresponding to a confirmation of the associated life event.

5. The method of claim 1, wherein each transaction of the plurality of transactions comprises one or more parameters associated therewith, wherein the one or more parameters comprises at least one or more of a merchant category code, a universal product code, a monetary amount, a facility associated with a particular transaction, a location of a particular transaction, a transaction date, a transaction time of day, a time since a last transaction, a time since last transaction that matches one or more other parameters, or a transaction day of a week.

6. The method of claim 1, further comprising:
  receiving, by the computing system from the client device, a denial from the target user regarding a second life event; and re-assessing, by the computing system, one or more second transactions associated with the second life event to generate a new life event corresponding thereto.

7. A method of generating a ledger, comprising:
identifying, by a computing system, a plurality of transactions associated with a plurality of users;
anonymizing, by the computing system, the plurality of transactions;
generating, by the computing system, a plurality of synthetic transactions configured to mimic real transactions;
generating, by the computing system, a prediction model to identify groups of related transactions by:
training, by the computing system, the prediction model to identify, based on the plurality of transactions and the plurality of synthetic transactions, a subset of transactions related to each other;
testing, by the computing system, the prediction model to identify a success ratio of the training, wherein the success ratio corresponds to a threshold level of accuracy; and
retraining and retesting, by the computing system, the prediction model until the prediction model groups transactions in accordance with the threshold level of accuracy;
retrieving, by the computing system, a set of target transactions associated with a target user;
identifying, by the prediction model, a baseline spending pattern of the target user for a subset of transactions included in the set of target transactions;
identifying, by the prediction model, one or more transactions of the set of target transactions that differ from the baseline spending pattern of the target user;
grouping, by the computing system, the one or more transactions of the set of target transactions into a cluster;
associating, by the computing system, a life event to the cluster of the one or more transactions;
generating, by the computing system, an interactive graphical user interface comprising a ledger that includes indication of the life event and corresponding transaction information associated with the life event; and
transmitting, by the computing system to a client device associated with the target user, the interactive graphical user interface.

8. The method of claim 7, further comprising:
receiving input, via the interactive graphical user interface, corresponding to a request to view the one or more transactions associated with the life event;
upon receiving the input, updating, by the computing system, the interactive graphical user interface by populating the interactive graphical user interface with the one or more transactions associated with the life event; and
transmitting, by the computing system, the updated interactive graphical user interface to the client device for display.

9. The method of claim 7, wherein prior to generating the interactive graphical user interface, the method further comprises:
interfacing, by the computing system, with the client device associated with the target user to confirm an associated life event.

10. The method of claim 9, wherein interfacing, by the computing system, with the client device associated with the target user to confirm the associated life event, comprises:
activating an interactive agent configured to interact with the client device;
generating, by the interactive agent, a confirmation message to be transmitted to the client device, the confirmation message seeking to confirm the associated life event; and
transmitting, by the interactive agent, the confirmation message to the client device.

11. The method of claim 10, wherein transmitting, by the interactive agent, the confirmation message to confirm the associated life event, comprises:
transmitting, by the interactive agent, the confirmation message as a text message to a text message application executing on the client device.

12. The method of claim 10, further comprising:
receiving, by the interactive agent, a confirmation from the client device via user interaction with a graphical user interface of an application executing on the client device.

13. The method of claim 10, generating, by the interactive agent, the confirmation message to be transmitted to the client device, the confirmation message seeking to confirm the associated life event, comprises:
generating, by the interactive agent, an electronic message comprising one or more pre-generated hyperlinks, the one or more pre-generated hyperlinks comprising at least one hyperlink corresponding to a confirmation of the associated life event.

14. The method of claim 7, wherein each transaction of the plurality of transactions comprises one or more parameters associated therewith, wherein the one or more parameters comprises at least one or more of a merchant category code, a universal product code, a monetary amount, a facility associated with a particular transaction, a location of a particular transaction, a transaction date, a transaction time of day, a time since a last transaction, a time since last transaction that matches one or more other parameters, or a transaction day of a week.

15. The method of claim 7, further comprising:
receiving, by the computing system from the client device, a denial from the target user regarding a second life event; and
re-assessing, by the computing system, one or more second transactions associated with the second life event to generate a new life event corresponding thereto.

16. A system for generating a ledger, comprising:
a processor in communication with one or more client devices associated with one or more users; and
a memory having programming instructions stored thereon, which, when executed by the processor, performs operations comprising:
identifying a plurality of transactions associated with a plurality of users;
anonymizing the plurality of transactions;
generating a plurality of synthetic transactions configured to mimic real transactions;
generating a prediction model to identify groups of related transactions by:
training a prediction model to identify, based on the plurality of transactions and the plurality of synthetic transactions, a subset of transactions related to each other;

testing the prediction model to identify a success ratio of the training, wherein the success ratio corresponds to a threshold level of accuracy; and retraining and retesting the prediction model until the prediction model groups transactions in accordance with the threshold level of accuracy;

retrieving a set of target transactions associated with a target user;

identifying a baseline spending pattern of the target user for a subset of transactions included in the set of target transactions;

identifying, by the prediction model, one or more transactions of the set of target transactions that differ from the baseline spending pattern of the target user;

grouping, by the prediction model, the one or more transactions of the set of target transactions into a cluster;

associating a life event to the cluster;

interfacing with a client device associated with the target user to confirm an associated life event;

upon receiving a confirmation from the target user regarding the associated life event, generating an interactive graphical user interface comprising a ledger that includes the confirmed life event; and transmitting the interactive graphical user interface to the client device associated with the target user.

17. The system of claim 16, wherein interfacing with the client device associated with the target user to confirm an associated life event, comprises:

activating an interactive agent configured to interact with the client device;

generating, by the interactive agent, a confirmation message to be transmitted to the client device, the confirmation message seeking to confirm the associated life event; and transmitting, by the interactive agent, the confirmation message to the client device.

18. The system of claim 17, wherein transmitting, by the interactive agent, the confirmation message to confirm the associated life event, comprises:

transmitting, by the interactive agent, the confirmation message as a text message to a text message application executing on the client device.

* * * * *